(12) United States Patent
Martin

(10) Patent No.: US 9,227,621 B2
(45) Date of Patent: Jan. 5, 2016

(54) HYBRID DRIVE

(71) Applicant: Michael Martin, Graz (AT)

(72) Inventor: Michael Martin, Graz (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 0 days.

(21) Appl. No.: 13/774,054

(22) Filed: Feb. 22, 2013

(65) Prior Publication Data

US 2013/0218383 A1  Aug. 22, 2013

(30) Foreign Application Priority Data

Feb. 22, 2012 (EP) .................................. 12156491

(51) Int. Cl.
| | |
|---|---|
| *B60L 9/00* | (2006.01) |
| *B60L 11/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *B60W 20/00* | (2006.01) |
| *B60K 6/46* | (2007.10) |
| *B60W 10/06* | (2006.01) |
| *B60W 10/08* | (2006.01) |
| *B60W 30/188* | (2012.01) |
| *B60L 11/12* | (2006.01) |

(52) U.S. Cl.
CPC ................. *B60W 20/00* (2013.01); *B60K 6/46* (2013.01); *B60L 11/12* (2013.01); *B60W 10/06* (2013.01); *B60W 10/08* (2013.01); *B60W 30/1882* (2013.01); *B60L 2240/12* (2013.01); *B60L 2240/44* (2013.01); *B60W 2530/16* (2013.01); *B60W 2710/0677* (2013.01); *Y02T 10/6217* (2013.01); *Y02T 10/6286* (2013.01); *Y02T 10/7005* (2013.01); *Y02T 10/7077* (2013.01); *Y10S 903/903* (2013.01)

(58) Field of Classification Search
CPC ...................... B60W 20/1084; B60W 30/1882; B60W 10/06
See application file for complete search history.

(56) References Cited

U.S. PATENT DOCUMENTS

| | | | | |
|---|---|---|---|---|
| 6,809,429 | B1* | 10/2004 | Frank | 290/40 C |
| 7,669,534 | B2* | 3/2010 | Kumar et al. | 105/35 |
| 7,979,147 | B1* | 7/2011 | Dunn | 700/94 |
| 8,167,064 | B2* | 5/2012 | Iwase et al. | 180/65.265 |
| 8,645,013 | B2* | 2/2014 | Sah et al. | 701/22 |
| 8,781,667 | B2* | 7/2014 | Wimmer et al. | 701/22 |
| 2002/0123836 | A1 | 9/2002 | Komiyama | |

(Continued)

FOREIGN PATENT DOCUMENTS

| | | |
|---|---|---|
| DE | 10 2008 002036 A1 | 6/2009 |
| DE | 10 2008 049225 A1 | 4/2010 |

(Continued)

*Primary Examiner* — Jerrah Edwards
*Assistant Examiner* — Tommy Worden
(74) *Attorney, Agent, or Firm* — Jordan IP Law, LLC; Todd A. Vaughn

(57) ABSTRACT

A hybrid drive for a motor vehicle and a method for the control thereof, the hybrid drive including a combustion engine; and a controller configured to determine an actual power demand required by the combustion engine during a present driving situation of the motor vehicle; determine a difference between a predefined power demand model of the combustion engine and the determined actual power demand; and control the combustion engine as a function of speed of the motor vehicle based on the determined difference.

20 Claims, 3 Drawing Sheets

(56) References Cited

U.S. PATENT DOCUMENTS

| | | | |
|---|---|---|---|
| 2004/0079564 A1* | 4/2004 | Tabata .................... | 180/65.2 |
| 2005/0241868 A1* | 11/2005 | Hommi ................. | B60K 6/445 |
| | | | 180/197 |
| 2006/0086546 A1* | 4/2006 | Hu et al. .................... | 180/65.2 |
| 2008/0122391 A1* | 5/2008 | Iwase et al. ................ | 318/460 |
| 2009/0259354 A1* | 10/2009 | Krupadanam et al. .......... | 701/22 |
| 2010/0004843 A1* | 1/2010 | Yu et al. ..................... | 701/102 |
| 2010/0217465 A1* | 8/2010 | Hoffmann ................... | 701/22 |
| 2012/0078456 A1* | 3/2012 | Hakumura et al. ............. | 701/22 |
| 2012/0207620 A1* | 8/2012 | Dalum et al. ............... | 417/44.1 |
| 2012/0239562 A1* | 9/2012 | Rich ........................... | 705/40 |
| 2012/0265409 A1* | 10/2012 | Takeda ........................ | 701/48 |
| 2012/0310441 A1* | 12/2012 | Fukushiro ..................... | 701/1 |
| 2013/0073134 A1* | 3/2013 | Yokouchi et al. ............. | 701/22 |
| 2013/0079965 A1* | 3/2013 | Muta et al. ..................... | 701/22 |
| 2013/0103234 A1* | 4/2013 | Sah et al. ...................... | 701/22 |
| 2013/0158764 A1* | 6/2013 | Wimmer et al. ............... | 701/22 |
| 2013/0173108 A1* | 7/2013 | Hashimoto .................... | 701/22 |
| 2013/0268153 A1* | 10/2013 | Ando et al. ................... | 701/22 |
| 2013/0297123 A1* | 11/2013 | Gibson et al. ................. | 701/22 |
| 2014/0222264 A9* | 8/2014 | Sujan et al. ................... | 701/22 |
| 2014/0236405 A1* | 8/2014 | Wakashiro .................... | 701/22 |

FOREIGN PATENT DOCUMENTS

| | | | |
|---|---|---|---|
| DE | 10 2010 003000 A1 | | 9/2011 |
| JP | H10-108304 A | | 4/1998 |
| JP | 2010138751 A | * | 6/2010 |

* cited by examiner

HYBRID DRIVE

CROSS-REFERENCE TO RELATED APPLICATIONS

The present application claims priority under 35 U.S.C. §119 to European Application EP 12156491.8 (filed on Feb. 22, 2012), which is hereby incorporated by reference in its entirety.

TECHNICAL FIELD

Embodiments concern a method for controlling a hybrid drive of a motor vehicle and a corresponding hybrid drive in accordance with the method.

BACKGROUND

In a serial hybrid drive, the drive wheels are driven by an electric drive. The electric drive, and the associated converter, is supplied by an electrical energy accumulator. A controller is configured to determine the motor power corresponding to a predefined driving situation (e.g., gas pedal position). To extend the travel range, as a range extender a combustion engine is provided which charges an electrical energy accumulator and a battery, via an alternator. The combustion engine is controlled depending on the driving situation, the power demand predefined by the driver and the actual power demand.

In a parallel and combined hybrid drive, the combustion engine works on the drive wheels, for example, via a converter and step-less gears, the electric motor acting in parallel on the drive train as a function of the power demand and acts as support. With use of a suitable coupling by way of which the combustion engine can be separated from the drive, a purely electric driving mode is also possible, the combustion engine supplying the electrical energy accumulator via an alternator and in this operating mode acts as a range extender for the serial hybrid drive described.

DE 100 07 136 A1 describes a drive power control system for a motor vehicle which uses a parallel hybrid system. A controller acting on the combustion engine is connected with various sensors detecting the driving situation, such as in particular a gas pedal sensor, travel speed sensor, battery sensor, engine rotation speed sensor. The combustion engine is controlled as a function of the torque demand required following a predefined strategy, in particular to operate said engine in an optimum efficiency range.

DE 10 2009 054 839 A1 describes a range extender for a hybrid motor vehicle. The amount of DC voltage converted from the AC voltage generated by the alternator is set by controlling the engine rotation speed of the combustion engine.

In the known hybrid systems or range extenders, the working noise of the combustion engine is often perceived by the driver as not matching the driving situation, and thus, is regarded as a disadvantage. This is the case, for example, if the combustion engine of the range extender is operated constantly at its best point, i.e., in a range in which the engine generates energy most efficiently. This best point often lies in the region of a relatively high rotation speed. Particularly, when the vehicle has stopped and at low speeds, however, it is unpleasant and unusual for the combustion engine to be operated at a higher rotation speed and hence with a loud engine noise.

Also changing between several operating points is not always acceptable to the driver. Thus it can occur that while driving at constant speed, the operating point is changed since, for example, the charge state of the battery requires this. Furthermore, from conventional vehicles (vehicles with combustion engine and manual or stepped automatic transmission), it is expected for the engine noise of the combustion engine to increase according to the fixed ratios of the transmission as the speed rises, and to diminish as the speed falls. Operating the combustion engine as a range extender with constant operating points, irrespective of speed, leads to a monotonous sound of the combustion engine, in particular without a typical noise change on acceleration and deceleration.

A further problem is the energy consideration. A range extender serves to extend the range of the vehicle when the vehicle is operated primarily electrically, which means that the combustion engine is active when the battery reaches a low charge state. To avoid further discharge of the battery, the energy generated by the range extender must be greater than the energy required to drive the vehicle and operate the ancillaries. If static operating points are allocated to the range extender in certain driving situations, e.g., full vehicle load or long uphill climbs, it may be that the power demand of the vehicle is greater than the power generated by the range extender in its allocated operating point. To compensate for this power difference, necessarily the power of the vehicle drive or drives must be reduced/limited.

SUMMARY

Embodiments are related to an enhanced hybrid drive and an enhanced control method for a motor vehicle in particular in relation to efficiency and driving perception.

In accordance with embodiments, a method for controlling a hybrid drive of a motor vehicle is provided, the hybrid drive comprising a combustion engine, an alternator configured to be driven by the combustion engine to generate electrical energy, an electrical energy accumulator, and an electric drive configured to be driven by the electrical energy accumulator. In order to charge the electrical energy accumulator, the combustion engine is configured to be controlled as a function of travel speed, wherein to control the power output of the combustion engine as a function of the travel speed of the vehicle, starting from a power demand predefined as a model, the actual power demand required in the present driving situation is determined, the difference between the model-predefined and actual power demand is determined and the combustion engine is operated in accordance with the resulting power difference.

In accordance with embodiments, a hybrid drive for a motor vehicle is provided, the hybrid drive comprising a combustion engine, an alternator configured to be driven by the combustion engine to generate electrical energy, an electrical energy accumulator and an electric drive configured to be driven by the electrical energy accumulator and a controller in active connection with the components, via which the combustion engine is controlled to charge the electrical energy accumulator as a function of the travel speed, for performance of said method, wherein the controller contains a model of a predefined power demand as a function of travel speed of the vehicle, and is adapted to determine the actual power demand required in the present driving situation and from this form the difference between the model-predefined and the actual power demand, whereupon the combustion engine is controlled in accordance with the resulting power difference.

In accordance with embodiments, a method for controlling a hybrid drive of a motor vehicle is provided, the hybrid drive including a combustion engine, an alternator driven by the combustion engine, a battery, and an electric drive driven by the battery, the method comprising charging the battery by controlling the power output of the combustion engine as a function of speed of the motor vehicle using a predefined power demand model, wherein an actual power demand required in a present driving situation is determined, a difference in power demand between the predefined power demand model and the actual power demand is determined and the combustion engine is controlled in accordance with the difference in power demand.

In accordance with embodiments, a method for controlling a hybrid drive of a motor vehicle is provided, the method comprising: determining an actual power demand by the combustion engine during a present driving situation of the motor vehicle; determining a difference between a predefined power demand model and the determined actual power demand; controlling the combustion engine as a function of speed of the motor vehicle based on the determined difference.

In accordance with embodiments, a hybrid drive of a motor vehicle comprises a combustion engine; and a controller configured to determine an actual power demand required by the combustion engine during a present driving situation of the motor vehicle; determine a difference between a predefined power demand model of the combustion engine and the determined actual power demand; and control the combustion engine as a function of speed of the motor vehicle based on the determined difference.

In accordance with embodiments, a method for controlling a hybrid drive of a motor vehicle is provided, the hybrid drive comprising a combustion engine, an alternator configured to be driven by the combustion engine to generate electrical energy, an electrical energy accumulator, and an electric drive configured to be driven by the electrical energy accumulator, and wherein the combustion engine is controlled as a function of travel speed to charge the energy accumulator.

In accordance with embodiments, to control the power output of the combustion engine as a function of travel speed of the vehicle, starting from a power demand predefined as a model, the actual power demand required in the present driving situation is determined, the difference between the model-predefined and the actual power demand is determined and the combustion engine is operated in accordance with the resulting power difference. The power output of the combustion engine of a range extender is adapted continuously via the difference between an ideal power demand and the real power demand according to the present driving situation.

It is, therefore, taken into account that in the case of an uphill climb and/or with a loaded vehicle, the power demand is greater and therefore the combustion engine of the range extender must provide a higher power i.e. be operated with a higher rotation speed.

In the reverse case, on a downhill descent, independently or in connection with the recovery of the braking energy generated by the electric drive motor or motors to the battery, the combustion engine is operated with a power which is reduced in relation to the power demand resulting from the model.

In the cases described, the combustion engine of the range extender is operated in such a manner that the noise developed corresponds to the driving situation. On an uphill climb, the combustion engine runs at higher speed than on a flat road. It is, therefore, appropriate for the higher force and power demand of such a driving situation. On a downhill descent similarly the reverse case applies, the combustion engine is operated at a lower rotation speed.

In accordance with embodiments, the actual power demand of the vehicle is determined from various signal sensors or status sampling. A useful signal may be the gas pedal position. If torque sensors are used in the drive train, these signals can also be used to determine the actual power demand. For electric drive mode, the electrical power consumption of the drive motor or motors and/or the current extraction from the battery may be used. In this way, a downhill descent and the resulting reduced power demand may be determined. This may be further achieved in connection with sampling of the brake pedal. Furthermore, by the sampling described of sensors or control elements (e.g., gas pedal sensor), an acceleration phase can be established. The resulting higher power demand is then used, in the form of the described difference in relation to the power demand resulting from the model, to control the combustion engine of the range extender. In this case, an increase in the rotation speed of the combustion engine results corresponding to the driving situation, acceleration, which is perceived as correct.

In accordance with embodiments, sensors may be configured to detect battery values, and to detect the voltage present and/or the current supplied. A battery state may be determined from these detected values. The driving situation may also be determined from the detected sensor values, and the combustion engine of the range extender is controlled based on the determined driving situation. From current and voltage values measured via corresponding sensors, via a battery model, the state of charge (SoC) and state of health (SoH) can be determined and from the SoC and the SoH the increased or reduced consumption may be adapted to the actual driving situation (in relation to the model) matched to the power. The combustion engine is controlled accordingly to generate a higher or lower charge power. Detection of the driving situation in particular takes into account the current extraction from the battery, in particular also in temporal development, and can thus detect climbing, descent, acceleration and braking phases.

In accordance with embodiments, the combustion engine of the range extender is controlled to achieve the necessary power following a predefined relationship between torque and rotation speed. It is known that a combustion engine can generate a necessary power with various combinations of rotation speed and torque values, wherein the efficiency of the power output depends on the combination concerned. In accordance with embodiments, the curve of the torque M and rotation speed n of the combustion engine of the range extender for any required power P is predefined, wherein the curve is selected such that the efficiency of the power output is as high as possible or the consumption and the resulting emissions are as low as possible.

In accordance with embodiments, a hybrid drive for a motor vehicle comprises a combustion engine, an alternator configured to be driven by the combustion engine to generate electrical energy, an electrical energy accumulator and an electric drive configured to be driven by the electrical energy accumulator, and a controller in active connection with the components, via which the combustion engine is configured to be controlled to charge the energy accumulator as a function of the travel speed.

The controller in accordance with embodiments contains a model of a predefined power demand as a function of the travel speed of the vehicle, determines the actual power demand required in the present driving situation, and from this determines the difference between the model-predefined and the actual power demand, whereupon the combustion engine is controlled according to the resulting power difference.

In accordance with embodiments, the controller is actively connected with sensors, switches and similar elements configured to detect the driving situation of the vehicle. This is, in particular, a sensor configured to detect a position of the gas pedal. Furthermore the brake pedal, torque sensors in the drive train, current and/or voltage measurement devices on the battery or the electric drive or also a tilt sensor may be used to detect the driving situation of the vehicle and be operatively connected with the controller.

In accordance with embodiments, the controller is configured to store a control curve which contains the correlation between the torque to be applied by the combustion engine and the applicable rotation speed. The combustion engine of the range extender is configured to provide the charge power for the battery required for the driving situation only in accordance with or along the stored curve. The control curve is selected such that the combustion engine is always operated in the efficient range i.e. with minimum fuel consumption and/or emissions.

DRAWINGS

An explanation of embodiments is given below with reference to the drawings.

DESCRIPTION

Figure 1:
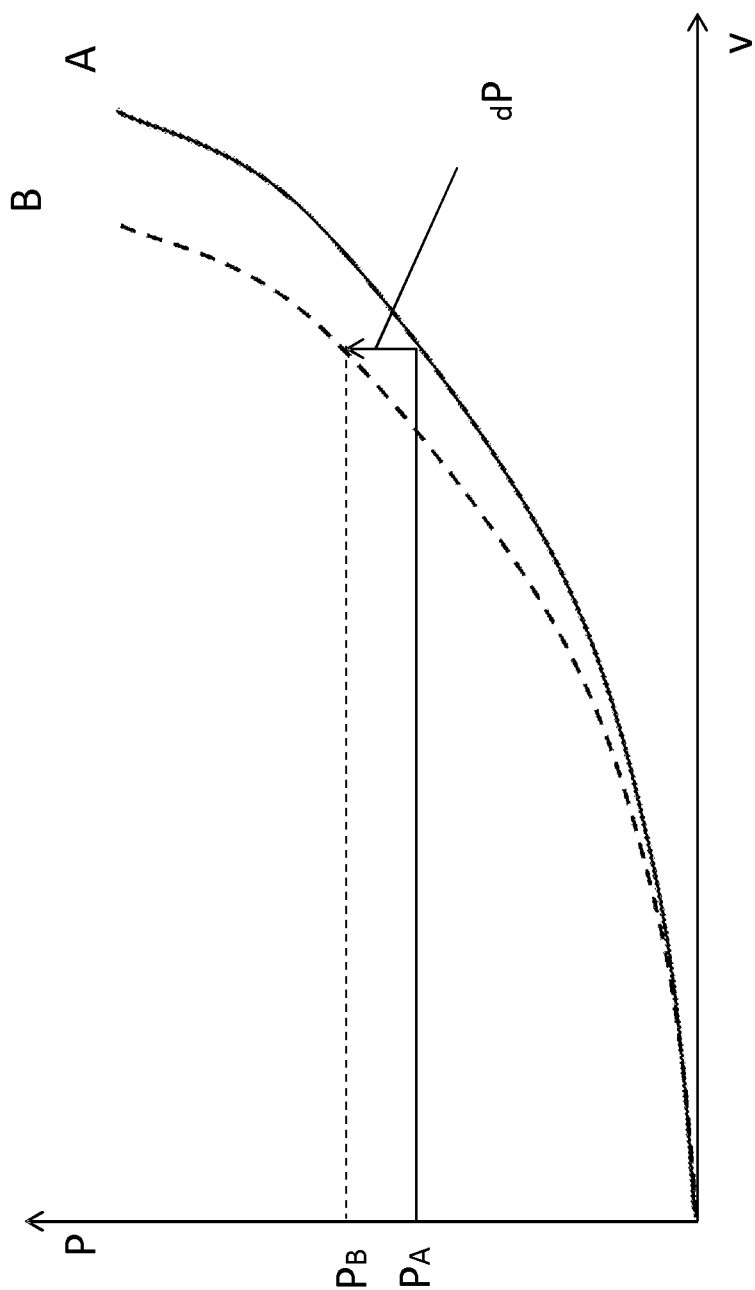
FIG. 1 illustrates a dependency determined as a model between the power P emitted by the combustion engine of the range extender and the vehicle speed v in the form of a curve A.

As illustrated in FIG. 1, the power required to drive the vehicle (disregarding acceleration processes) rises disproportionately with the vehicle speed. If as a first approximation only the air resistance is taken into account, the power required rises with $v^3$. To cover this demand and avoid discharging the battery, the power P of the combustion engine of the range extender must be increased as the vehicle speed v rises.

The solid line curve A corresponds to the normal power demand determined in the model, which assumes in particular the power demand of a vehicle with defined weight, known rolling resistance of the tires and a flat road surface, i.e., a road surface without uphill or downhill gradients.

The dotted line of curve B, however, corresponds to the actual power demand of the vehicle which is determined by data measured or by analysis of sensors and signal emitters.

For a present travel speed v, the power demand calculated in accordance with the model is $P_A$, the power demand in accordance with the actual driving situation is $P_B$. As the example shown is an uphill climb, the power difference is positive, i.e., the power demand due to the present driving situation is greater than the power demand in accordance with the model. The power difference dP is, therefore, greater than zero, the combustion engine of the range extender is operated with a power which is greater than the power demand determined in the model for travel speed v.

Figure 2:
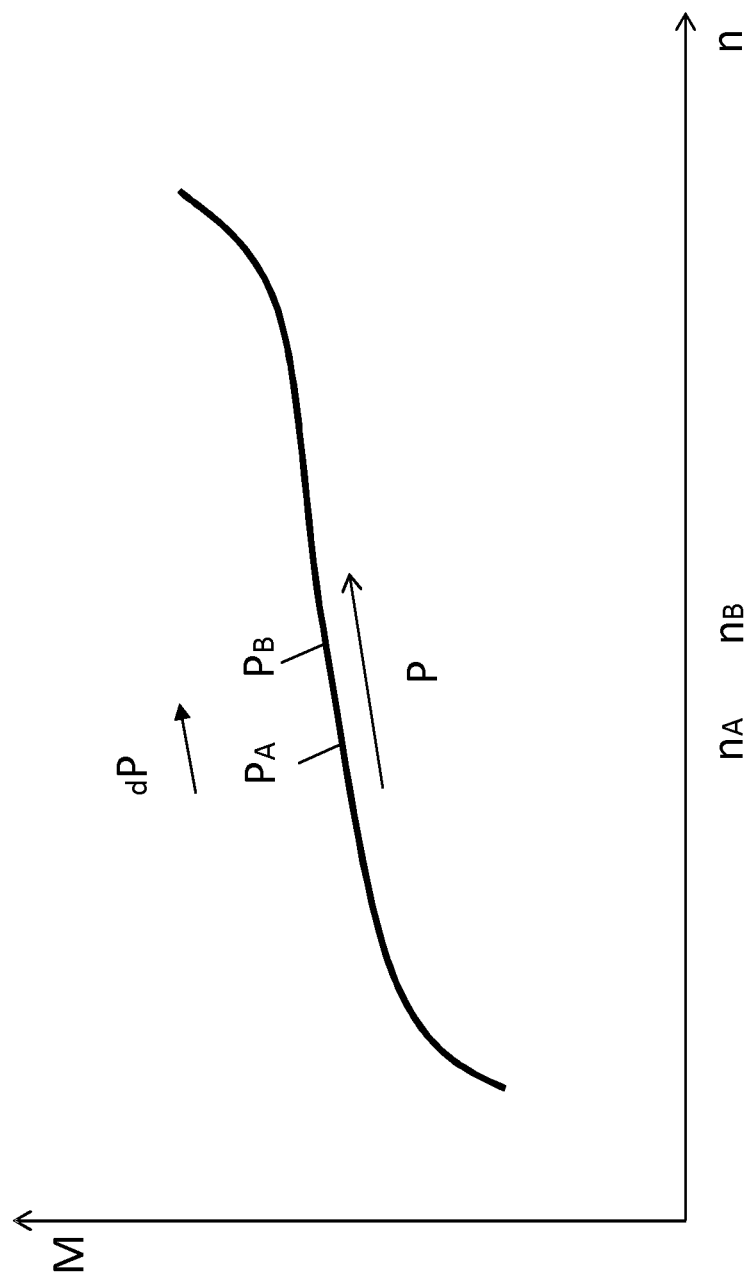
FIG. 2 illustrates the correlation between the torque M and rotation speed n of the combustion engine of the range extender.

As illustrated in FIG. 2, the desired power P can be achieved by various combinations of torque M and rotation speed n, wherein the efficiency, the consumption of the power output, depends on the combination concerned. According to the invention the curve of torque M and rotation speed n of the combustion engine is predefined unchanged for each power P required, wherein the curve is selected such that the efficiency of the power output is as high as possible, or the consumption and associated emissions are as low as possible. The curve M(n) in FIG. 2 is stored in the vehicle control unit and at each point contains a combination of torque M and rotation speed n with which the combustion engine of the range extender is operated. The arrow marked on the curve M(n) with power symbol P indicates in which direction the power increases, i.e., how the combustion engine should be controlled for an increased or reduced power demand.

For a given speed v, the control unit of the vehicle establishes a difference dP between the standard power demand (curve A) and the actual power demand (curve B), whereupon the necessary operating point for the combustion engine of the range extender is adapted accordingly as shown in FIG. 2. This operating point is now no longer at rotation speed nA but at a higher speed nB.

For the driver of the vehicle, the acoustic behaviour of the range extender is now acceptable, as travel speed v rises or on an uphill climb, the rotation speed n of the range extender rises, conversely the rotation speed n of the range extender falls as the speed v falls. At the same time, following the predefined curve between torque M and rotation speed n, the combustion engine of the range extender is operated as energy-efficiently as possible. Furthermore, it is ensured that on a high power demand (for example, extended uphill climbs or fully loaded vehicle) or also on a reduced power demand (for example extended downhill descents or unladen vehicle), firstly the range extender is operated with the lowest possible power in order, among other things, to keep the acoustic (noise) development as low as possible, and secondly always enough power is generated to secure the power demand and avoid power losses or limitations.

The energy generated by the range extender which is not required to drive the vehicle or operate ancillaries is used to charge the battery. Depending on the form of the curve, it can also be achieved that the battery is charged with approximately constant power irrespective of driving situations.

In the manner described, via the control unit of the vehicle, the combustion engine of the range extender can detect not only uphill climbs and downhill descents, but also acceleration or braking processes. The extra or reduced demand for power due to acceleration or deceleration is detected for the respective speed and the combustion engine of the range extender is controlled accordingly. This then changes its rotation speed again following the predefined curve, as explained with reference to FIG. 2.

Figure 3:
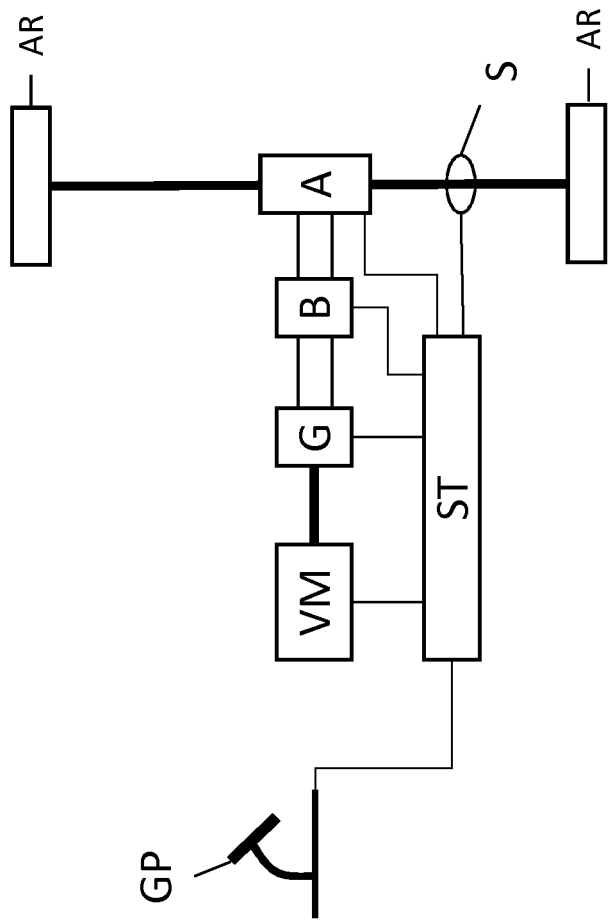
FIG. 3 illustrates the components of the controller ST for a hybrid drive in accordance with embodiments.

As illustrated in FIG. 3, a serial hybrid drive with a combustion engine VM includes an alternator G configured to be driven by the combustion engine VM, a downstream battery/energy accumulator B configured to receive electric energy supplied by the alternator G, and a drive A comprising an electric motor (not shown) configured to drive the drive wheels AR. A controller ST is in signal connection with the combustion engine VM, the alternator G, the battery B, the drive A, and the wheels AR. One or more sensors S are provided and configured to detect, for example, a drive moment on the drive wheels AR. The controller ST is configured to detect the position of the gas pedal GP.

Advantageously, the controller ST, in order to charge the electrical energy accumulator, is configured to control the power output of the combustion engine VM as a function of a specific parameter, such as travel speed of the vehicle. In order to do this, using a power demand predefined as a model, the actual power demand required in the present driving situation is determined, the difference between the model-predefined and actual power demand is determined and the combustion engine VM is operated in accordance with the resulting power difference.

Advantageously, the controller ST is configured to receive and/or store a model of a predefined power demand as a function of travel speed of the vehicle. Using the model, the controller ST is configured to determine the actual power demand required in the present driving situation and from this form the difference between the model-predefined and the actual power demand, whereupon the combustion engine VM is controlled in accordance with the resulting power difference.

Advantageously, the controller ST is configured to thereby control the power output from the combustion engine VM as a function of travel speed in order to charge the energy accumulator/battery B. Accordingly, the power output of the combustion engine VM of a range extender is adapted continuously via the difference between an ideal power demand and the actual power demand in accordance with a present driving situation.

Moreover, the combustion engine VM of the range extender is advantageously operated in such a manner that the acoustic (noise) developed corresponds to the driving situation. On an uphill climb, the combustion engine runs at higher speed than on a flat road. It is, therefore, appropriate for a higher force and power demand of such a driving situation. On a downhill descent similarly the reverse case applies, the combustion engine VM is operated at a lower rotation speed in accordance with the controller ST.

Advantageously, the actual power demand of the vehicle is determined using sensors S or status sampling to sense one or more specific parameters, such as, for example, the gas pedal position, torque, electrical power consumption of the drive motor(s) when in electric drive mode, and/or the current extraction from the battery. In this way, a downhill descent and the resulting reduced power demand may be determined. This may be further achieved in connection with sampling of the brake pedal. Furthermore, by the sampling described of the sensors S or control elements (e.g., gas pedal sensor), an acceleration phase can be established. The resulting higher power demand is then used, in the form of the described difference in relation to the power demand resulting from the model, to control the combustion engine VM of the range extender. In this case, an increase in the rotation speed of the combustion engine VM corresponding to the driving situation (for example, acceleration) results.

The sensor(s) S may be configured to detect the present voltage and/or the current supplied for the battery B, and in particular a battery state which may be determined from the detected values. The driving situation may be determined from the detected values, and the driving situation is used by the controller ST to control the combustion engine VM of the range extender. From current and voltage values measured via corresponding sensors S, via a battery model, the state of charge (SoC) and state of health (SoH) can be determined and from determined SoC and SoH, the increased or reduced consumption may be adapted to the actual driving situation (in relation to the model) matched to the power. The combustion engine VM is controlled by the controller ST accordingly to generate a higher or lower charge power. Detection of the driving situation in particular takes into account the current extraction from the battery B, in particular also in temporal development, and can thus detect climbing, descent, acceleration and braking phases.

Advantageously, the combustion engine VM of the range extender is configured to be controlled by the controller ST in order to achieve the necessary power following a predefined relationship between torque and rotation speed. In accordance with embodiments, the curve of the torque M and rotation speed n of the combustion engine VM of the range extender for any required power P is predefined, in which the curve is selected such that the efficiency of the power output is as high as possible or the consumption and the resulting emissions are as low as possible.

In accordance with embodiments, the controller ST is actively connected with sensors and/or switches and/or similar elements configured to detect the driving situation of the vehicle. At least one of the accelerator pedal position, the brake pedal position, torque in the drive train, current and/or voltage measurement devices on the battery or the electric drive and/or also a tilt sensor may be used to detect the driving situation of the vehicle and be operatively connected with the controller.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling a serial hybrid drive of a motor vehicle and which serial hybrid drive includes a combustion engine used as a range extender, an alternator driven by the combustion engine, a battery, and an electric motor driven by the battery and which drives the wheels of the motor vehicle, the method comprising:
    charging the battery, via the alternator, by controlling a power output of the combustion engine as a function of speed of the motor vehicle using a predefined power demand model based on a power required to drive the motor vehicle by the electric motor as a function of a speed of the motor vehicle;
    determining an actual power demand by the motor vehicle based upon, when the motor vehicle is being driven by the electric motor, an actual power of the motor vehicle and an actual speed of the motor vehicle; and
    controlling the combustion engine based on a determined difference between the determined actual power demand by the motor vehicle and the predefined power demand model in such a manner that noise developed during operation of the serial hybrid drive corresponds to a present driving situation in which the motor vehicle, driven by the electric motor, is in a phase of at least one of climbing, descent, acceleration and braking.

2. The method of claim 1, wherein determining the actual power demand comprises taking a status sampling of at least one of sensors and control elements of the motor vehicle.

3. The method of claim 2, wherein determining the actual power demand comprises using at least one sensor signal to detect at least one of a tilt and an acceleration of the motor vehicle in a direction of travel of the motor vehicle.

4. The method of claim 1, wherein determining the actual power demand comprises detecting a power consumption of the electric motor of the motor vehicle.

5. The method of claim 1, wherein determining the actual power demand comprises detecting a voltage value supplied to the battery.

6. The method of claim 1, wherein determining the actual power demand comprises detecting an electric current value supplied to the battery.

7. A method for controlling a serial hybrid drive of a motor vehicle and which serial hybrid drive includes a combustion engine used as a range extender, an alternator driven by the combustion engine, a battery, and an electric motor driven by the battery and which drives the wheels of the motor vehicle, the method comprising:
  determining an actual power demand required by the combustion engine during a present driving situation in which the motor vehicle, driven by the electric motor, is in a phase of at least one of climbing, descent, acceleration and braking;
  determining a difference between the determined actual power demand and a predefined power demand model of the combustion engine; and
  controlling the combustion engine as a function of speed of the motor vehicle, driven by the electric motor, based on the determined difference and in such a manner that noise developed during operation of the serial hybrid drive corresponds to the present driving situation.

8. The method of claim 7, wherein determining the actual power demand comprises detecting a tilt of the motor vehicle in a direction of travel of the motor vehicle.

9. The method of claim 7, wherein determining the actual power demand comprises detecting a power consumption of the electric motor.

10. The method of claim 7, wherein determining the actual power demand comprises detecting a voltage supplied to the battery based on a battery model that incorporates voltage values.

11. The method of claim 7, wherein determining the actual power demand comprises detecting an electric current based on a battery model that incorporates electric current values.

12. The method of claim 7, wherein determining the actual power demand comprises detecting an acceleration of the motor vehicle in a direction of travel of the motor vehicle.

13. A serial hybrid drive for a motor vehicle, the serial hybrid drive comprising:
  a combustion engine used as a range extender;
  an alternator driven by the combustion engine;
  a battery;
  an electric motor driven by the battery and which drives the wheels of the motor vehicle; and
  a controller in operative communication with the combustion engine, the alternator, the battery, and the electric motor, and which is configured to:
  determine an actual power demand of the motor vehicle required by the combustion engine during a present driving situation in which the motor vehicle, driven by the electric motor, is in a phase of at least one of climbing, descent, acceleration and braking;
  determine a difference between a predefined power demand model of the combustion engine and the determined actual power demand; and
  control the combustion engine as a function of speed of the motor vehicle based on the determined difference and in such a manner that noise developed during operation of the serial hybrid drive corresponds to the present driving situation in which the motor vehicle is driven by the electric motor.

14. The serial hybrid drive of claim 13, further comprising a sensor in operative communication with the controller and which is to detect the torque of the combustion engine.

15. The serial hybrid drive of claim 13, further comprising a sensor in operative communication with the controller and which is to detect the voltage supplied to the battery.

16. The serial hybrid drive of claim 13, further comprising a sensor in operative communication with the controller and which is to detect the current supplied to the battery.

17. The serial hybrid drive of claim 13, further comprising a sensor configured in operative communication with the controller and which is to detect a position of an accelerator pedal of the motor vehicle.

18. The serial hybrid drive of claim 13, wherein the actual power demand required is determined based on a tilt of the motor vehicle in a direction of travel of the motor vehicle.

19. The serial hybrid drive of claim 13, wherein the actual power demand required is determined based on an acceleration of the motor vehicle in a direction of travel of the motor vehicle.

20. The serial hybrid drive of claim 13, wherein the actual power demand required is determined from a power consumption of the electric motor.

* * * * *